United States Patent [19]

Chalifoux et al.

[11] Patent Number: 4,942,920
[45] Date of Patent: Jul. 24, 1990

[54] HEAT EXCHANGER LEAK DETECTION

[75] Inventors: Raymond J. Chalifoux; John Kozachuk, both of Sarnia, Canada

[73] Assignee: Polysar Limited, Sarnia, Canada

[21] Appl. No.: 343,601

[22] Filed: Apr. 27, 1989

[30] Foreign Application Priority Data

Jun. 16, 1988 [CA] Canada .................................. 569673

[51] Int. Cl.[5] ........................ G01M 3/28; G01M 3/22; F28F 11/00
[52] U.S. Cl. ...................................... 165/1; 165/11.1; 73/40.5 R; 73/40.7
[58] Field of Search ...................... 165/1, 11.1, 70, 83; 73/40.5 R, 40.7

[56] References Cited

U.S. PATENT DOCUMENTS

| | | | |
|---|---|---|---|
| 1,626,772 | 5/1927 | Worden | 165/83 |
| 1,831,454 | 11/1931 | Kirgan | 165/83 |
| 2,512,748 | 6/1950 | Lucke | 165/83 |
| 4,226,113 | 10/1980 | Pelletier et al. | 73/40.7 |
| 4,467,635 | 8/1984 | Dahmén et al. | 73/40.5 R |
| 4,606,220 | 8/1986 | Rudiger | 73/40.5 R |

FOREIGN PATENT DOCUMENTS

| | | | |
|---|---|---|---|
| 3420180 | 12/1985 | Fed. Rep. of Germany | 165/11.1 |
| 0098797 | 6/1982 | Japan | 165/11.1 |
| 0055696 | 4/1983 | Japan | 165/11.1 |

Primary Examiner—John Ford
Attorney, Agent, or Firm—Stevens, Davis, Miller & Mosher

[57] ABSTRACT

The present invention relates to a convenient process to detect leaks in a partially disassembled floating head-type heat exchanger. The heat exchanger is partially disassembled by removing the floating head end shell cover. A lightweight, flexible membrane having low gas permeability is then attached to the exchanger so as to cover the floating head gap. Gas is then introduced into the shell side of the exchanger.

Leaks may be detected by observing the end face of the floating head tube sheet for an indication of the gas using a soap solution and observing the formation of soap bubbles.

5 Claims, 3 Drawing Sheets

HEAT EXCHANGER LEAK DETECTION

FIELD OF THE INVENTION

The present invention relates to improvements in the detection of leaks in floating-head type heat exchangers.

BACKGROUND OF THE INVENTION

Heat exchangers are extensively used in the Chemical Process Industry. The term "shell and tube" describes a large genus of heat exchangers, and the term "floating head exchanger" specifically refers to a particular species within the shell and tube genus.

Such heat exchangers are well known to those skilled in the art, and are described in such basic reference manuals as *Chemical Engineer's Handbook*, Perry and Green, ed, Sixth Edition, McGraw-Hill, (1984).

As the phrase shell and tube implies, a heat exchanger "tube" (or more often, a plurality of tubes—known as a "tube bundle") is contained within a shell. The tubes are normally held in place by a "tube sheet". The term "tube sheet" refers to a flat plate having a plurality of holes which correspond in size and number to the tubes. Thus, the tube sheet defines the arrangement of the tubes in the tube bundle, according to the pattern of the holes in the tube sheet.

At one end of the tube bundle, the "fixed tube sheet" is fixed in place and is in contact with the shell. At the opposite end of the tube bundle, the "floating head tube sheet" is not fixed to the shell, thus leaving an open space between the shell and the floating head tube sheet, which is referred to as the "floating head gap".

Shell and tube heat exchangers are normally used to exchange heat between two fluid streams by passing one fluid stream through the shell (hereafter the "shell side") and a second fluid stream through the tube bundle (hereafter the "tube side").

Exchangers of this type are designed to keep the shell side fluid stream separate from the tube side fluid stream. The design is defeated, however, by leaks within the exchanger—for example, a hole in even one tube will allow some mixing of the two fluid streams. Leaks in floating head exchangers are undesirable. Such leaks may also be dangerous, depending upon the characteristics of the respective fluid streams.

The repair of leaks in an exchanger requires the shutdown and partial disassembly of the exchanger, which is a time consuming and expensive process. Thus, for reasons of safety and efficiency, it is important that leaks be properly detected and identified.

The method which is conventionally employed to detect leaks in a floating head heat exchanger involves the use of a metal "test ring", in a hydrostatic test. To begin with, the shell of the exchanger is partially disassembled to expose the floating head tubesheet. A metal test ring is then attached to the shell, and to the floating head tubesheet, so as to enclose the aforesaid floating gap. In addition, packing and a packing ring are typically employed to produce the final seal. Thus, the test ring seals the floating head gap but leaves the exterior end face of the floating head tubesheet open for inspection. Accordingly, the test ring must be very carefully fabricated to provide a close fit between the shell and the floating head tubesheet.

After the test ring is installed, water is introduced into the shell of the exchanger. If a tube is leaking, water will be visibly evident at the end of that tube.

The above test procedure has many disadvantages. It will be apparent that the test ring must conform to the dimensions of both the shell and the floating head tubesheet.

Heat exchangers are not always standard sizes and therefore a user of many different floating head exchangers is often faced with the fabrication and storage of many different test rings. The test rings are normally fabricated from a ferrous alloy, and often weigh several hundred pounds. Therefore, in addition to their inherent fabrication and storage problems, the test rings are sufficiently difficult to handle that heavy equipment is required to assist with their installation.

Accordingly, it is one object of the present invention to provide an improved apparatus for use in the detection of leaks in floating head heat exchangers.

It is another object of the present invention to provide an improved process to detect leaks in a floating head exchanger.

SUMMARY OF THE INVENTION

There is provided a test apparatus for use in a partially disassembled floating head heat exchanger having a shell body, a floating head tube sheet and a floating head gap; the apparatus comprising a lightweight, flexible, membrane having low gas permeability, first membrane attachment means and second membrane attachment means; wherein the membrane is attached to the perimeter of the floating heat tubesheet with the first membrane attachment means and to the shell body with the second membrane attachment means such that the membrane forms a continuous envelope which encloses the floating head gap but which does not cover the exterior end face of the floating head tubesheet.

There is also provided a process to detect leaks in a partially disassembled floating head exchanger having a shell body, a floating heat tube sheet and a floating head gap, the process comprising the steps of:
 (i) attaching a lightweight flexible membrane having low gas permeability to the perimeter of the floating head tube sheet with first membrane attachment means, and to the shell body with second membrane attachment means such that the membrane forms a continuous envelope which encloses the floating head gap but which does not cover the exterior end face of the floating head tube sheet;
 (ii) introducing pressurized gas into the shell such that the membrane is exposed to a gauge pressure of at least 2 pounds per square inch but less than 40 pounds per square inch;
 (iii) observing the exterior end face of the tube sheet for the presence of gas leakage.

DESCRIPTION OF THE PREFERRED EMBODIMENTS

Figure 1:
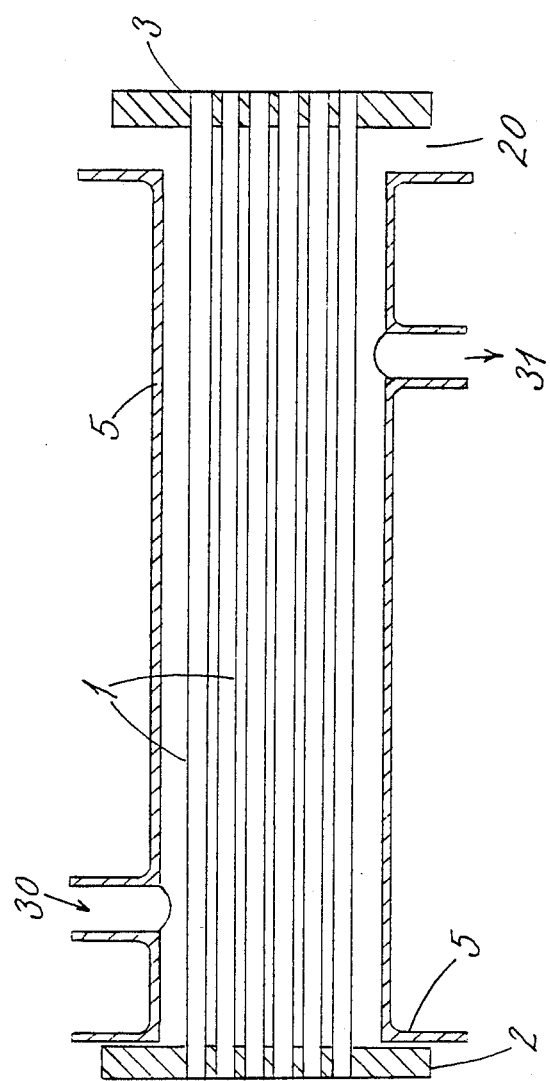
FIG. 1 is a sectional view of a partially disassembled floating head heat exchanger.

FIG. 1 illustrates a partially disassembled heat exchanger, with both of the end shell covers removed.

Referring to FIG. 1, a plurality of tubes 1 communicates with fixed tubesheet 2 and with floating tubesheet 3. The tubes 1 are contained within a shell.

Fixed tubesheet 2 is secured in place relative to shell body 5. A gasket (not shown) is normally inserted between shell body 5 and fixed tubesheet 2 to provide an air tight enclosure.

Floating head gap 20 is located between floating head tubesheet 3 and shell body 5.

In an assembled floating head heat exchanger, the shell side fluid stream is introduced through shell inlet port 30 and exits through shell outlet port 31.

It will be apparent that the shell side of the partially disassembled exchanger shown in FIG. 1 will not hold fluid, since fluid may escape through the floating head gap 20.

Figure 2:
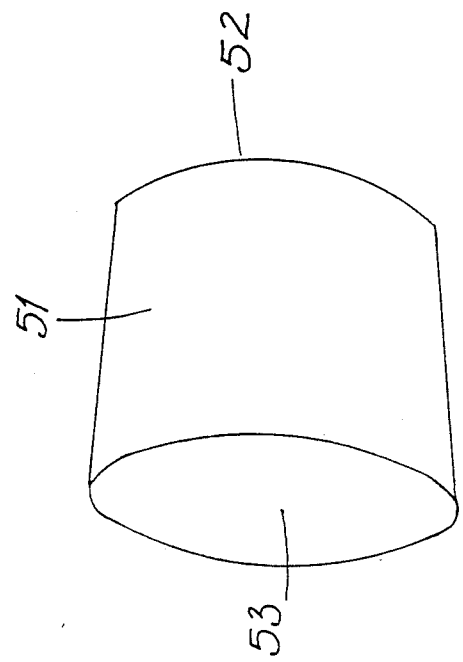
FIG. 2 is an isometric view of a flexible membrane for use in the present invention.

FIG. 2 is an isometric view of a lightweight flexible membrane. The membrane has a continuous surface 51, first open end 52 and second open end 53. The membrane must be constructed from a material which is flexible and which is not highly permeable to gas. The membrane must be capable of withstanding a gauge pressure (i.e. a pressure above atmospheric pressure) of 2 to 3 pounds per square inch (p.s.i.) and preferably is capable of withstanding between 25 and 30 p.s.i. Suitable materials of construction for the membrane are numerous, and include tightly woven fabric, non woven fabric, plastic film such as polyethylene film and rubber film. Polyethylene film of the appropriate thickness is especially preferred, for reasons of convenience and economy.

A more durable, but more costly, membrane may be prepared from a rubber film. Isobutylene-isoproprene copolymer (butyl rubber) is particularly suitable, due to its low gas permeability.

Figure 3:
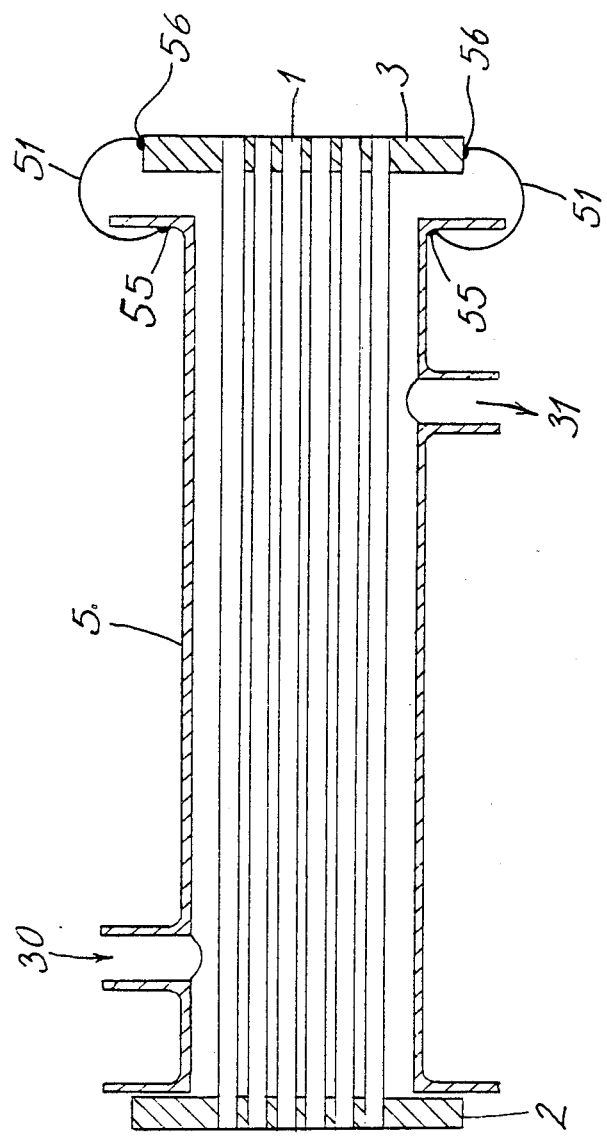
FIG. 3 is a sectional view of an embodiment of the invention.

FIG. 3 illustrates a sectional view of an apparatus for detecting leaks in a floating head exchanger.

Flexible membrane 51 is attached to the outside of the shell body 5 with first attachment means 55 and to the perimeter of the floating heat tube sheet 3 with second membrane attachment means 56.

The material of construction for the attachment means 55 and 56 is not critical to the present invention, and simple materials such as rope or strapping are suitable.

It is essential that the membrane does not cover the exterior end face of the floating tube sheet 3. Thus, when the membrane 51 is attached, a person may view the exterior end face of the floating tube sheet 3 and observe the ends of the tubes 1.

The apparatus shown in FIG. 3 may be used in a process to detect tube leaks in a floating head heat exchanger. The process starts by introducing a pressurized gas into inlet shell port 30. The shell outlet port 31 should be at least partly blocked (and is preferably completed blocked) to permit the gas pressure within the shell body 5 to increase. The outlet port 31 may be blocked by a valve (not shown) or other suitable means.

The pressurized gas inflates the flexible membrane 51, indicating the presence of an above atmospheric pressure within the shell 5. A minimum gauge pressure of about 2 p.s.i. is suitable, although a pressure of between 10 and 15 p.s.i. is preferred. Higher pressures may be used but are not required. Pressures above about 40 p.s.i. are preferably not used because the risk of membrane failure is increased.

Leaks may be detected by observing the floating head tubesheet, as explained below.

A leak in a tube 1 will allow the gas into that tube. Similarly a leak between the floating head tubesheet 3 and tube 1 will permit gas to escape. The presence of a leak may be detected from the sound of the gas as it escapes through the leak.

In a preferred embodiment, the exposed tubes at the fixed tubesheet 2 are covered to increase gas flow at the opposite end. The tubes may be covered with, for example, adhesive tape or sheets made from a flexible magnetic material.

In a highly preferred embodiment, a soap solution is applied to the exterior end face of the floating tubesheet 3 so that the location of leaks will be visibly evident due to the formation of soap bubbles.

The type of gas which is used in this preferred embodiment of the leak detection process is not critical to the success of the process. For reasons of simplicity and economy, it is normally preferred to use pressurized air. However, if there is concern regarding the potential presence of flammable materials in the exchanger, an inert gas such as nitrogen may be employed.

What is claimed is:

1. A process to detect leaks in a partially disassembled floating head exchanger having a shell body, a floating head tube sheet and a floating head gap, said process comprising:
   (i) attaching a lightweight highly flexible film or fabric membrane having low gas permeability to the perimeter of said floating head tubesheet with first membrane attachment means and to the outside of said shell body with second membrane attachment means, such that said membrane forms a continuous envelope which encloses said floating head gap but which does not cover the exterior end face of said floating head tube sheet, and
   (ii) introducing pressurized gas into the shell such that said membrane is exposed to a gauge pressure of at least 2 pounds per square inch but less than 40 pounds per square inch, and
   (iii) observing the exterior end face of said tubesheet for the presence of gas leakage.

2. The process of claim 1 wherein said gas is air.

3. The process of claim 1 which further comprises applying a soap solution to said exterior end face of said tubesheet.

4. In a partially disassembled floating head heat exchanger having a shell, a floating head tube sheet and a floating head gap; a test apparatus comprising a lightweight, highly flexible film or fabric membrane having low gas permeability, first membrane attachment means and second membrane attachment means, wherein said membrane is attached to the perimeter of said floating head tubesheet with said first membrane attachment means and to the outside of said shell with said second membrane attachment means such that said membrane forms a continuous envelope which encloses said floating head gap but does not cover the exterior end face of said floating head tubesheet.

5. The apparatus of claim 4 wherein said membrane comprises polyethylene film.

* * * * *